May 15, 1956 — M. KORTICK — 2,745,177
CUTTING TOOL
Filed June 27, 1955

INVENTOR.
MORRIS KORTICK
BY Max Schwartz
ATTORNEY

United States Patent Office 2,745,177
Patented May 15, 1956

2,745,177
CUTTING TOOL

Morris Kortick, Cranston, R. I.

Application June 27, 1955, Serial No. 517,988

10 Claims. (Cl. 30—186)

My present invention relates to hand tools, and more particularly to a novel construction of a hand cutting tool.

The principal object of the present invention is to provide a hand cutting tool that is particularly suitable for cutting plastic material, more especially the sprue from a plastic mold.

Another object of the present invention is to provide a hand cutting tool having interchangeable cutting blades.

A further object of the present invention is to provide a hand cutting tool for plastic material which materially prolongs the useful life of the tool.

Another object of the present invention is to provide a hand cutting tool with interchangeable blades, which is simple in construction and easy and economical to manufacture and assemble.

With the above and other objects and advantageous features in view, my invention consists of a novel arrangement of parts, more fully disclosed in the detailed description following, in conjunction with the accompanying drawings, and more particularly defined in the appended claims.

In the molding of plastic and similar materials, the multiple cavities of the mold are connected by channels or gates through which the material flows to each cavity. At the completion of the molding operation, the finished pieces are connected by the lengths of plastic or other material that is formed in these gates. This is called the sprue, and must be trimmed off by hand. The cut must be made neatly and flush with each piece. For this purpose it is customary to modify a pair of snub nosed cutting pliers by grinding the blade ends thin and sharp and flat on one side. However, it has been found that such hand tools require frequent sharpening and regrinding. Furthermore, the wear on the pivot is great and soon the cutting ends are out of alignment. Consequently the life of such cutting tools is comparatively short and their replacement and upkeep forms a considerable expense in the molding art.

The present invention is designed to largely overcome these defects by providing a cutting tool with replaceable blades that can be quickly and easily mounted in the tool, and by providing a longer life pivot construction to keep the blades in alignment.

Figure 1:
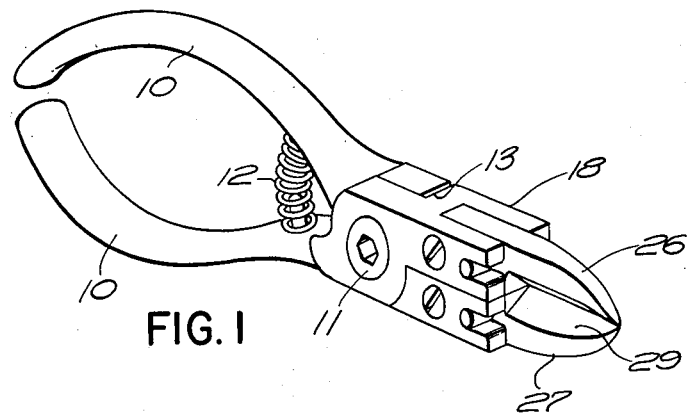
Fig. 1 is a perspective view of a hand cutting tool embodying my invention.

Referring more in detail to the drawings, my novel cutting tool is shown in Fig. 1. It comprises a pair of curved handle portions 10 pivoted to each other at 11. The handle portions 10 are normally held in open positions by a spring 12, here illustrated as a coil spring, but which may be a leaf spring if desired. Since the blades must meet rather than pass each other as in a pair of scissors, the portions 10 are each cut away at 13 at the pivot so that the heads will swing in the same arc. This is the normal construction of conventional cutting pliers.

Figures 2, 3:
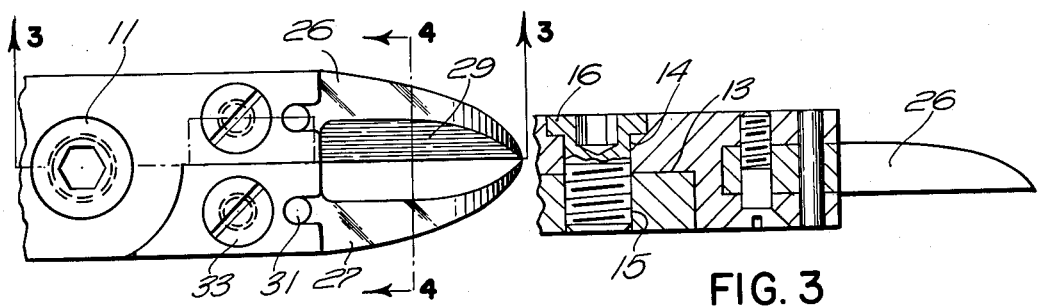
Fig. 2 is an enlarged plan view of the cutting head.
Fig. 3 is a section taken on line 3—3 on Fig. 2.
Figures 4, 5:
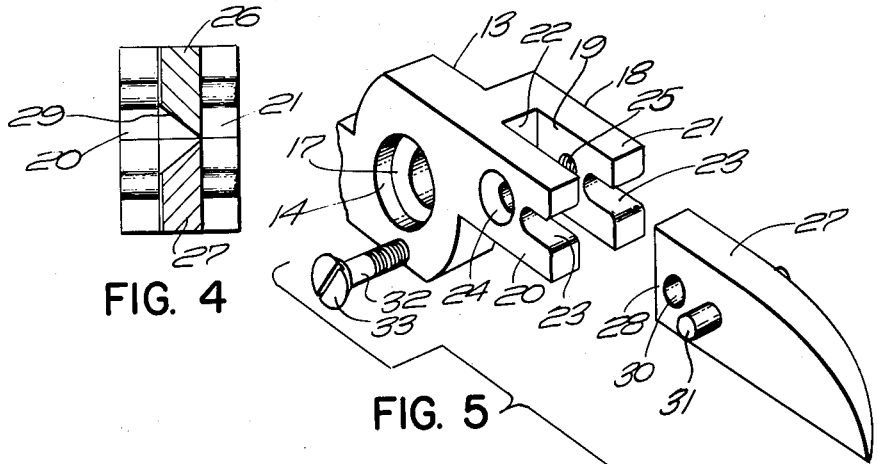
Fig. 4 is a section taken on line 4—4 on Fig. 2.
Fig. 5 is an exploded perspective view of the cutting blade and mounting.

Referring to Figs. 3 and 5, the pivot 11 is a screw type which permits adjustment for wear. One member 10 is provided with an unthreaded T-shaped opening 14 and the other member is provided with a threaded opening 15 with a class 1 thread to ensure a close fit. A fillister screw 16 is inserted so that it passes through the T-shaped opening 14 and threads into the opening 15 with the screw head bearing against the shoulder 17 of the opening 14. In this type of pivot, the wear is between the shoulder 17 and the screw head. After some use, the parts wear and become loose. Tightening of the pivot screw 16 will bring them together again into tight alignment.

Now referring to Figs. 1 and 5, each member 10 terminates beyond the pivot 11 in a socket or blade holding portion 18. It comprises a short rectangular portion having a transverse slot 19 extending inwardly from the outer end and dividing the portion 18 into spaced parallel arms 20 and 21. The bottom of each slot 19 is squared off, as at 22 to form a close fit with the butt of the blades. The outer ends of the arms 20 and 21 are provided with aligned U-shaped cut out portions 23. Beyond the cut outs 23, the arm 20 is provided with a tapered opening 24, and the arm 21 is provided with a threaded opening 25 in alignment with the opening 24.

The cutting blades 26 and 27 are easily removed, replaced and remounted in the tool. Referring to Fig. 5, each blade is square at the butt end 28 and tapers to form a snubbed end as shown in Figs. 1 and 2. Each blade is bevelled as at 29 to form a straight, flat cutting edge as they meet in back of the bevelled portion. The squared butt end 28 fits snugly against the squared bottom 22 of the slot 19. Adjacent this end, the blade is provided first with the opening 30 and then a pin 31 protruding from each side of the blade.

Referring again to Fig. 5, the blade 27 is slipped into the slot 19 so that the pin 31 slips into the U-shaped cut outs 23 and the opening 30 is in alignment with the openings 24 and 25. A machine screw 32 with a tapered head 33 is inserted through the openings as shown in Fig. 3 to lock the blade in the slot. The squared ends and pin and cut out arrangement ensure rigidity of the blade. The blades 26 and 27 may be of any desired thickess or shape and may be angularly disposed if desired.

The blades 26 and 27 can be economically stamped and sharpened and can easily be removed and replaced when dull. This eliminates costly toolroom labor and equipment for the grinding and sharpening of large quantities of tools. The above construction saves time, labor and costs and greatly prolongs the life of each cutting tool. Other advantages of the present invention will be readily apparent to a person skilled in the art.

I claim:

1. A cutting tool comprising a pair of complementary handle members pivoted to each other, each member having a short rectangular portion extending integrally beyond the pivot, a cutting blade for each of said members, and means for locking said blades in said members, said means including a slot in each rectangular portion, a pin extending through each blade and a U-shaped cut out at the end of each rectangular portion at each side of said slot, said pins entering said cut outs when said blades are placed in said slots.

2. A cutting tool comprising a pair of complementary handle members pivoted to each other, said pivot comprising an adjustable screw, each member having a short rectangular portion extending integrally beyond the pivot, a cutting blade for each of said members, and means for locking said blades in said members, said means including a slot in each rectangular portion, a pin extending through each blade and a U-shaped cut out at the end of each rectangular portion at each side of said slot, said pins entering said cut outs when said blades are placed in said slots.

3. A cutting tool comprising a pair of complementary handle members pivoted to each other, each member having a short rectangular portion extending integrally beyond the pivot, a cutting blade for each of said members, and means for releasably and rigidly locking said blades in said members, said means including a slot in each rectangular portion, a pin extending through each blade and a U-shaped cut out at the end of each rectangular portion at each side of said slot, said pins entering said cut outs when said blades are placed in said slots.

4. A cutting tool comprising a pair of complementary handle members pivoted to each other, said pivot comprising an adjustable screw, each member having a short rectangular portion extending integrally beyond the pivot, a cutting blade for each of said members, and means for releasably and rigidly locking said blades in said members, said means including a slot in each rectangular portion, a pin extending through each blade and a U-shaped cut out at the end of each rectangular portion at each side of said slot, said pins entering said cut outs when said blades are placed in said slots.

5. A cutting tool comprising a pair of complementary handle members pivoted to each other, each member having a short rectangular portion extending integrally beyond the pivot, a cutting blade for each of said members, and means for locking said blades in said members, said means including a slot in each rectangular portion, a pin extending through each blade and a U-shaped cut out at the end of each rectangular portion at each side of said slot, said pins entering said cut outs when said blades are placed in said slots, and a screw extending through each of said rectangular portions and blades.

6. A cutting tool comprising a pair of complementary handle members pivoted to each other, said pivot comprising an adjustable screw, each member having a short rectangular portion extending integrally beyond the pivot, a cutting blade for each of said members, and means for locking said blades in said members, said means including a slot in each rectangular portion, a pin extending through each blade and a U-shaped cut out at the end of each rectangular portion at each side of said slot, said pins entering said cut outs when said blades are placed in said slots, and a screw extending through each of said rectangular portions and blades.

7. A cutting tool comprising a pair of complementary handle members pivoted to each other, each member having a short rectangular portion extending integrally beyond the pivot, a cutting blade for each of said members, and means for releasably and rigidly locking said blades in said members, said means including a slot in each rectangular portion, a pin extending through each blade and a U-shaped cut out at the end of each rectangular portion at each side of said slot, said pins entering said cut outs when said blades are placed in said slots, and a screw extending through each of said rectangular portions and blades.

8. A cutting tool comprising a pair of complementary handle members pivoted to each other, said pivot comprising an adjustable screw, each member having a short rectangular portion extending integrally beyond the pivot, a cutting blade for each of said members, and means for releasably and rigidly locking said blades in said members, said means including a slot in each rectangular portion, a pin extending through each blade and a U-shaped cut out at the end of each rectangular portion at each side of said slot, said pins entering said cut outs when said blades are placed in said slots, and a screw extending through each of said rectangular portions and blades.

9. A cutting tool comprising a pair of complementary handle members pivoted to each other, each member having a short rectangular portion extending integrally beyond the pivot, a cutting blade for each of said members, and means for locking said blades in said members, each of said blades having a straight cutting edge bevelled on one side, said means including a slot in each rectangular portion, a pin extending through each blade and a U-shaped cut out at the end of each rectangular portion at each side of said slot, said pins entering said cut outs when said blades are placed in said slots.

10. A cutting tool comprising a pair of complementary handle members pivoted to each other, each member having a short rectangular portion extending integrally beyond the pivot, a cutting blade for each of said members, and means for locking said blades in said members, each of said blades having a straight cutting edge bevelled on one side, said means including a slot in each rectangular portion, a pin extending through each blade and a U-shaped cut out at the end of each rectangular portion at each side of said slot, said pins entering said cut outs when said blades are placed in said slots, and a screw extending through each of said rectangular portions and blades.

References Cited in the file of this patent

UNITED STATES PATENTS

| Re. 638 | Braden | Dec. 28, 1858 |
| 130,184 | Braithwaite | Aug. 6, 1872 |
| 458,860 | Root | Sept. 1, 1891 |
| 1,648,498 | Morgan | Nov. 6, 1927 |
| 1,862,556 | Welhaven | June 14, 1932 |
| 2,009,502 | Lambert | July 30, 1935 |

FOREIGN PATENTS

| 426,695 | Great Britain | Apr. 8, 1935 |
| 792,445 | France | Oct. 21, 1935 |